United States Patent [19]

Zvonicek et al.

[11] 4,252,833

[45] Feb. 24, 1981

[54] METHOD OF THERMIC TREATMENT OF CEREAL PRODUCTS

[75] Inventors: Jan Zvonicek, Prague; Milos Protiva, Pecky; Rudolf Dohnalek; Miroslav Cáp, both of Prague, all of Czechoslovakia

[73] Assignee: Ceske vysoke uceni technicke v Praze, Prague, Czechoslovakia

[21] Appl. No.: 61,622

[22] Filed: Jul. 30, 1979

Related U.S. Application Data

[63] Continuation-in-part of Ser. No. 804,621, Jun. 8, 1977, abandoned.

[51] Int. Cl.$^3$ .............................................. A23K 1/00
[52] U.S. Cl. .................................. 426/241; 426/242; 426/512; 426/521; 426/807
[58] Field of Search ..................... 426/241, 242, 243; 99/386, 443 C, 451, 483

[56] References Cited

U.S. PATENT DOCUMENTS

| | | | |
|---|---|---|---|
| 3,141,777 | 7/1964 | Guidarelli et al. | 426/242 |
| 3,662,673 | 5/1972 | Boyer et al. | 426/241 |
| 3,694,220 | 9/1972 | Pierce | 426/242 |
| 3,701,670 | 10/1972 | Pierce | 99/451 X |
| 3,961,569 | 6/1976 | Kenyon et al. | 99/451 |

*Primary Examiner*—R. B. Penland

[57] ABSTRACT

A two-stage method of thermic treatment of cereals, pulses or oil-seeds to increase the gelatinizing of starch and hydrolysis thereof, whereby to increase the efficiency of use of grains as a feed and food product. The grain is heated by infrared radiation in the first stage for 5–120 seconds from ambient temperature to 100°–200° C., and in the second stage it is kept for 30–120 seconds at substantially the temperature reached in the first stage.

1 Claim, No Drawings

METHOD OF THERMIC TREATMENT OF CEREAL PRODUCTS

This application is a continuation-in-part of application Ser. No. 804,621, filed June 8, 1977 now abandoned.

This invention relates to a method of two-stage thermic treatment of grains by the action of infrared radiation.

Because of the rapid increase of population all over the world, it is necessary for an adequate increase of food, whether it be of a vegetable or animal origin, to be ensured. It is also very important to decrease losses which may reach approximately 40% of the world production in the time between the production of raw material and its use.

It is also necessary to increase the efficiency of agricultural products used as animal foodstuffs and as raw material for foodstuff industries, as by changing substances included in vegetable products into substances which are nutritively and productionally more advantageous by making their useful parts more easily used.

The common prior methods of treating grain consist of milling, crushing, pressing and steaming. The principles of these processes have not been changed for a long time inspite of improvements, in apparatus for such processes. Some newer processes, e.g., hydrothermic treatments and dry treatments have been tested and put into experimental operation. In one of such hydrothermic treatments, the grain is heated for 8-30 minutes up to 95°-99° C. by means of steam at atmospheric pressure or for 1-3 minutes up to 95°-100° C. by means of compressed steam in an autoclave, and after some time it is "shot out" of the autoclave upon a sudden decrease of pressure. During this process, the structure of the grain is changed, starch grains gelatinize and a partial hydrolysis of starch into dextrins and lower sugars soluble in water takes place.

Similar effects may be reached with dry heating up to a temperature of 150°-250° C. for an interval of 10-100 seconds. This is especially true with processes tested in recent years (U.S. Pat. No. 3,694,220, Ch. W. Pierce entitled "Infrared Radiation of Seed"; U.S. Pat. No. 3,701,670, Ch. W. Pierce entitled "Infrared Micronizing Cooker"; U.S. Pat. No. 3,691,569, E. M. Kenyon et al. entitled "Apparatus for Continuous Microwave Sterilization of Food in Pouches"; U.S. Pat. No. 3,662,673, R. A. Boyer et al. entitled "Textured Protein Products"; U.S. Pat. No. 3,141,777, E. J. Guidarelli et al. entitled "Treatment of Soybeans"; British Pat. No. 1,379,116, D. Newton entitled "Improvements Relating to the Treatment of Cereals and Other Seeds", in which grain is heated from the inside by means of electromagnetic oscillation by subjecting it to a field of ultrashort waves or infrared radiation. A resonant oscillation of the molecules inside the grain takes place by the above-mentioned effects and so the grain is rapidly heated.

By the action of electromagnetic waves in the field of ultrashort waves or infrared radiation, the temperature in the grain increases nearly linearly with respect to time. Simultaneously, some physical and chemical changes inside the grain take place, e.g., a partial change of water into steam, which together with a higher temperature causes a gelatinizing of the starch and perhaps it causes the above-mentioned partial hydrolysis under pressure as well; the covering of the grain functions as a miniature autoclave. When increasing the temperature, the inner overpressure of steam increases as well; this may cause a rupture of the softened grain. The subsequent expansion of steam, together with the cooling down of the grain and the stopping of such processes in some cases proves to be disadvantageous.

The above drawback is obviated throughout a great range of treatment by a method of two-stage thermic treatment of grain according to the invention. In accordance with the invention, in the first stage the grain is heated for 5-120 seconds from ambient temperature up to 100°-200° C. by infrared radiation, and in the second stage the grain is kept for 30-120 seconds at the temperature which it reached at the end of the first stage. The temperature of the grain in the first stage is controlled by adjusting the intensity of the infrared rays and the time that the grain stays in the radiation zone. The temperature of the grain in the second stage is kept constant, controlled advantageously by thermal insulation and/or by means of electrical resistance heating. Following such treatment, the grain is flaked (rolled) while hot, and is then cooled down to a temperature under 40° C.

The advantage of the two-stage method according to the invention will be seen by comparison with similar processes: For instance, with the above-mentioned U.S. patents in mind, the improvement of the present invention consists in the first place in the significant improvement in the economy of the process while securing or increasing the quality of such product. With some sorts of grains, it is mainly possible to shorten the heating time in the first stage and to increase the time of the second stage, i.e., by suitable holding of the grain at the temperature reached in the first stage to obtain the product with the identical, or better, properties, as far as digestability, as the above-mentioned prior thermic processes.

By shortening the first stage—the heating by infrared radiation—the capacity of the processing machinery proportionally increases and appreciable savings in the energy requirements are realized.

The temperature cycle and the time intervals during which the grain is held in both stages must be determined experimentally for each kind of product with respect to optimum conditions for a course of desired changes.

During the treatment according to the invention, the grain is partially dried and sterilized.

The method according to the invention may be applied especially for the thermic treatment of cereals, pulses, and oil plant products, hereinafter termed "cereal products."

Laboratory tests of grain specimens heat-treated in accordance with the two-stage technological process of the invention were carried out. There were determined in the usual manner the dry solid content, the percentage of starch degraded by enzymatic process AACC 76-30 A, the degree of Maillard reaction by the spectrophotocolorimetric method, and with soybeans the urease activity as an index of the antitrypsin content defect.

The "Maillard E nm=375" number indicates the degree of the undesirable reaction course between sugars and aminoacids in the treated grain specimens, E being the extinction of the ethanol-extract purity by nm=375 on the spectrophotocolorimeter.

The increasing Maillard number with the prolongation of the infrared heating time indicates the progressive enlargement of the portion of sugars reacted on aminoacids in the thermic treated grains. These compounds cannot be utilized by animals and dominates by a definite level the beneficial influence of the thermic treatment of the remaining starch and possibly on the proteins in the grain.

The above-described test results are shown in the following tables (Note: In the column entitled "Treatment Method" in each of Tables I and II, the first figure indicates the time of dwelling of the product in the infrared radiation zone, while the second figure indicates the time of dwelling of the grain in the second stage without any additional heat supply.)

TABLE I

Wheat - Laboratory Test Date May 12, 1977

| Spec. No. | Treatment Method sec/sec | Dry Solids in % | AACC degraded starch in % | Maillard E nm = 375 |
|---|---|---|---|---|
| 680 | untreated | 87.58 | 4.82 | 0.215 |
| 681 | 20/— | 90.44 | 8.42 | 0.215 |
| 682 | 30/— | 90.54 | 11.46 | 0.220 |
| 683 | 45/— | 92.15 | 16.01 | 0.240 |
| 684 | 60/— | 93.06 | 14.10 | 0.250 |
| 685 | 80/— | 94.83 | 23.16 | 0.500 |
| 686 | 30/60 | 95.40 | 24.36 | 0.210 |

TABLE II

Soybean - Laboratory Test Date February 25, 1977

| Spec. No. | Treatment Method sec/sec | Dry Solids in % | Urease ml/0.1N/$H_2SO_4$ per 1 g. spec | Maillard E nm = 375 |
|---|---|---|---|---|
| 620 | untreated | 90.43 | 8.82 | 0.465 |
| 621 | 20/— | 92.13 | 5.88 | 0.650 |
| 622 | 50/— | 95.42 | 1.47 | 0.880 |
| 623 | 80/— | 96.82 | 0.49 | 1.900 |
| 624 | 20/60 | 93.59 | 0.00 | 0.770 |

It is obvious from the above Tables that the capacity of the processing machinery is increased by two or three times by the application of the two-stage technology (Nos. 686, 624) compared to the currently used one-stage methods (Nos. 681–685, 621–623) while securing the same or better quality product.

Although the invention is illustrated and described with reference to a plurality of preferred embodiments thereof, it is to be expressly understood that it is in no way limited to the disclosure of such embodiments, but is capable of numerous modification within the scope of the appended claims.

What is claimed is:

1. A two-stage thermic treatment of a cereal grain product, comprising heating the product in a first stage for a period of from 5–120 seconds by infrared radiation to raise the temperature from ambient temperature to 100°–200° C., and in a second stage, immediately following the first stage, holding the product at said temperature for from 30–120 seconds, then rolling the product, and thereafter cooling the rolled product to a temperature under 40° C.

* * * * *